US012643016B1

(12) United States Patent
    Costa

(10) Patent No.: US 12,643,016 B1
(45) Date of Patent: Jun. 2, 2026

(54) INDUCTION HEATING OF GOLF BALL MOLD FOR CONSISTENT DURABILITY AND INCREASED KNIT STRENGTH

(71) Applicant: Acushnet Company, Fairhaven, MA (US)

(72) Inventor: Edward Costa, Providence, RI (US)

(73) Assignee: Acushnet Company, Fairhaven, MA (US)

( * ) Notice: Subject to any disclaimer, the term of this patent is extended or adjusted under 35 U.S.C. 154(b) by 27 days.

(21) Appl. No.: 18/522,579

(22) Filed: Nov. 29, 2023

(51) Int. Cl.
    B29C 45/26 (2006.01)
    A63B 45/00 (2006.01)
    B29C 33/06 (2006.01)

(52) U.S. Cl.
    CPC .............. A63B 45/00 (2013.01); B29C 33/06 (2013.01); B29C 45/26 (2013.01)

(58) Field of Classification Search
    CPC .......... A63B 45/00; B29C 33/06; B29C 45/26
    See application file for complete search history.

(56) References Cited

U.S. PATENT DOCUMENTS

| | | | | | |
|---|---|---|---|---|---|
| 5,827,548 | A | * | 10/1998 | Lavallee | B29C 45/14819 425/117 |
| 5,837,183 | A | * | 11/1998 | Inoue | B29C 45/73 264/328.16 |
| 9,731,465 | B2 | | 8/2017 | Kim et al. | |
| 2014/0183786 | A1 | * | 7/2014 | Kim | B29D 99/0042 264/278 |

* cited by examiner

*Primary Examiner* — Alison L Hindenlang
*Assistant Examiner* — Shibin Liang
(74) *Attorney, Agent, or Firm* — Steven Landolfi, Jr.

(57) ABSTRACT

A retractable pin injection molding assembly is used to make a golf ball layer in an injection mold. The injection mold has an induction coil and a mold cavity defining a cavity surface. In a molding process, a golf ball subassembly is positioned in the mold cavity and an injection material is supplied to an injection port of a runner system disposed in the injection mold. The injection material is at an injection temperature at the injection port and the induction coil is activated to heat the cavity surface to a target temperature which is less than the injection temperature. During molding, injection material is forced through the runner system to thereby begin to fill the mold cavity. At a heat stop time, the induction coil is deactivated, allowing the injection material to harden.

19 Claims, 6 Drawing Sheets

INDUCTION HEATING OF GOLF BALL MOLD FOR CONSISTENT DURABILITY AND INCREASED KNIT STRENGTH

TECHNICAL FIELD

The present disclosure relates generally to induction heating of a retractable pin injection mold for forming a cover of a golf ball, and, more particularly, to an induction heating system that maintains the injection material at a target temperature during molding.

BACKGROUND

Conventionally, golf ball covers are made by either compression molding two preformed half shells about a core or by injection molding of a thermoplastic material about a core. Current retractable pin injection molds ("RPIMs") for forming golf ball cover layers utilize a series of conduits to transport a thermoplastic material to individual mold cavities. These conduits are referred to as runners and are typically uninsulated. The thermoplastic material travels through the cold runners and passes into the mold cavity through gates, which are positioned at the mold parting line. RPIM for molding cover layers offers material selection flexibility, as well as a reduction in process steps compared to conventional compression molding techniques for molding cover layers on multi-layered golf balls. However, some RPIM molds may deal with "early freezing" of material due to longer travel of the melt front. The material that first enters the mold travels to the polar regions of the golf ball, and the material that enters the mold last stays near and hardens at the parting line between the two molds. Early freezing of the material may cause unbalanced flow, introduce defects, and adversely affect the strength of the finished cover material. Golf balls with reduced material strength may experience issues with impact durability. Another problem that can be the result of early freezing is incomplete or unfilled parts, a scenario in which the injection material does not flow to every part of the mold before solidifying.

Accordingly, there is a need in the art for an improved retractable pin injection mold system that targets material freezing to produce better overall quality and impact durability.

SUMMARY

The problems described above, as well as others, are addressed by the following inventions, although it is to be understood that not every embodiment of the inventions described herein will address each of the problems described above.

In an embodiment, the present disclosure includes a method of forming a golf ball layer in an injection mold including an induction coil and a mold cavity defining a cavity surface. The method includes positioning a golf ball subassembly in the mold cavity and supplying an injection material to an injection port of a runner system disposed in the injection mold. The injection material is at an injection temperature at the injection port. The method further includes activating the induction coil to heat the cavity surface to a target temperature which is less than the injection temperature. The method further includes forcing the injection material through the runner system to thereby begin to fill the mold cavity with the injection material from the runner system, deactivating the induction coil, and allowing the injection material to harden.

According to another aspect of the present disclosure, the target temperature is approximately the melting temperature of the injection material or approximately the glass transition temperature of the injection material. In some embodiments, the injection temperature is between approximately 400° F. and 475° F. In some embodiments, the target temperature is between approximately 100-175° F. less than the injection temperature. In some embodiments, the target temperature is between approximately 120-140° F. less than the injection temperature.

According to another aspect of the present disclosure, the induction coil is deactivated while the mold cavity is filling with the injection material. In some embodiments, the induction coil is deactivated when the mold cavity is more than 50% filled. In some embodiments, the induction coil is deactivated when the mold cavity is 55-75% filled. In some embodiments, the induction coil is deactivated when the mold cavity is 75-95% filled.

According to another aspect of the present disclosure, the method of forming a golf ball layer also includes extending a plurality of retractable pins into the mold cavity to securely position the golf ball subassembly. In some embodiments, the retractable pins are hydraulically, pneumatically, or electrically actuated. In some embodiments, filling the mold cavity includes injecting the injection material into the mold cavity through an injection gate extending around a circumference of the mold cavity until the mold cavity is completely filled. In some embodiments, the gate is a ring gate or an edge gate. In some embodiments, the injection material includes at least one of a polyurethane or ionomer material.

According to another aspect of the present disclosure, the injection mold further includes a cooling system including a cooling channel configured to receive a cooling liquid. In some embodiments, the induction coil is configured to heat the cavity surface against a cooling effect of the cooling system while the cooling liquid is in the cooling channel. In some embodiments, the cooling liquid cools the cavity surface to a demolding temperature after the induction coil is deactivated. In some embodiments, the method of forming a golf ball layer also includes removing the molded parts after the cavity surface reaches the demolding temperature. In some embodiments, the demolding temperature is between approximately 50-100° F. less than the target temperature. In some embodiments, the method of forming a golf ball layer also includes reactivating the induction coil after the molded parts are removed.

BRIEF DESCRIPTION OF THE DRAWINGS

Further features and advantages can be ascertained from the following detailed description that is provided in connection with the drawings described below.

DETAILED DESCRIPTION

Figure 1:
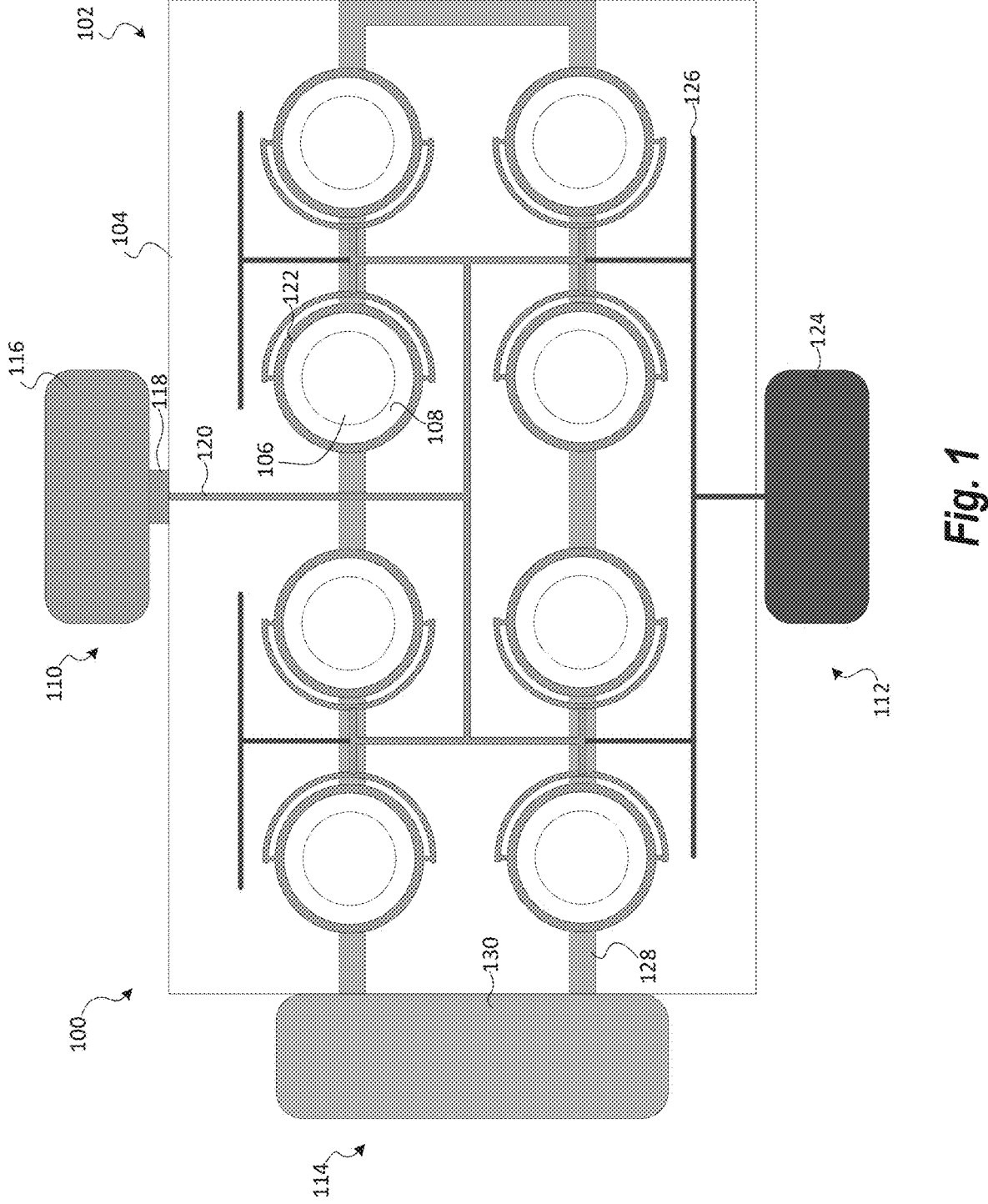
FIG. 1 is a plan view diagram of an injection mold having a plurality of mold cavities, an injection system, a heating system, and a cooling system, according to an exemplary embodiment of the present disclosure.

The present disclosure describes an induction heating system for a retractable pin injection mold ("RPIM") for manufacturing a golf ball. Retractable pin injection molding involves a pair of substantially hemispherical mold halves that each include gates, which allow heated, viscous thermoplastic polymeric injection material intended for the layer to pass into the mold, and vents, which allow trapped air and gases to escape from the mold. Retractable pins are positioned to hold the core or subassembly about which the layer is to be formed centered within the spherical mold cavity. The injection material is injected into the spherical cavity through the gates and trapped air and gases escape through the vents. When the mold is filled with injection material such that the golf ball subassembly has stabilized within the injection material, the retractable pins are retracted, and the injection material flows into and fills the space vacated by the retractable pins. After the mold is completely filled with injection material, the injection material is allowed to harden. The mold is then opened, and the molded golf ball precursor is ejected, either via ejector pins, or by any method known in the art.

When a golf ball layer is formed by an injection molding process with multiple gates, the injection material entering from a gate eventually intersects with the injection material entering via a neighboring gate. Knit lines may be formed at the intersection of the converging flow fronts. Depending on the composition of the injection material, the material strength can be reduced by as much as 10% to 60% along the knit lines. Thus, because the layer is inherently weaker along the knit lines, a ball is more likely to fail at a knit line when hit. These failures are thus a result of an incomplete mixing of the various components of the cover material and freezing/cooling that takes place at the flow front before the injection material intermixes with material from different sources, i.e., from different gates. The disclosed embodiments include heating systems configured to heat a cavity surface to thereby maintain a target material temperature during a target time window in the molding cycle to promote complete mixing at the flow fronts and inhibit the creation of knit lines.

According to disclosed embodiments, induction heating of a cavity surface may be timed to maintain the temperature of the injection material above a transition temperature of the material during the period in which the material is flowing into and around the mold. In one embodiment, the cavity surface is heated to at least approximately the melting temperature of the injection material. In another embodiment, the cavity surface is heated to at least approximately the glass transition temperature of the injection material. The selected transition temperature may depend on the type of injection material used (e.g., for some materials the system may perform more efficiently when the melting temperature is used, while other materials may benefit from the use of the glass transition temperature as the transition temperature). This period of heating the mold is followed by a rapid removal of the heat source so as to not inhibit the material from solidifying into a solid layer of a golf ball when the timing is appropriate. By increasing the temperature of the cavity surface, the injection material takes longer to freeze in the mold. This extra time before freezing allows for better mixing at flow fronts, improved knit line strength, and thus improved durability of molded layers. The heat induction system may include a heat source configured to connect and disconnect to and from molds having built-in induction coils.

Referring to FIG. 1, a golf ball mold assembly 100 includes an injection mold 102 having a mold body 104. In one example, the golf ball mold assembly 100 is part of an RPIM system. The injection mold 102 includes molding components configured to perform at least an injection molding step of a golf ball manufacturing process. The mold body 104 includes structural components configured to hold at least one mold cavity 106 in a position for molding a golf ball layer. For example, the mold body 104 may include a platen structure configured to receive a plurality of mold cavities 106, including opposing mold cavities for forming two hemispheres of a golf ball.

Each mold cavity 106 defines a cavity surface 108 configured to mold a fluid injection material into a solid golf ball layer. In one example, each mold cavity 106 is configured to receive a golf ball subassembly (e.g., a golf ball core) and also receive an injection material between the golf ball subassembly and the cavity surface 108. The injection material thereafter hardens into a layer that surrounds and encloses the golf ball subassembly and includes a surface texture and pattern corresponding to the cavity surface 108. In an exemplary embodiment, the injection mold 102 directs injection material to the mold cavity 106 to mold a cover or casing layer around a golf ball core positioned in the mold cavity 106. The cavity surface 108 defines an outer surface of the molded cover or casing layer (e.g., a dimple pattern formed on the outer surface of a cover layer or a smooth outer surface of a casing layer).

In an exemplary embodiment, the golf ball mold assembly 100 includes an injection system 110, a heating system 112, and a cooling system 114. The injection system 110 is configured to deliver molten injection material to each mold cavity 106 where it fills the open space to take the shape of and subsequently harden into a layer of a golf ball. In an embodiment, the injection system 110 includes a material supply 116, an injection port 118, and a runner system 120 that delivers injection material through the mold body 104 to the mold cavities 106. At the mold cavities 106, the injection material is forced through injection gates 122 and into an interior of the mold cavity 106.

During molding, fluid injection material from the material supply 116 is injected at the injection port 118 into the injection mold 102 at an injection temperature. The injection material travels through the runner system 120 to the mold cavities 106. In a conventional RPIM system, while the injection material travels through the runner system 120 and fills the mold cavities 106, the injection material cools and drops below the injection temperature. If, during molding, the injection material drops below a transition temperature, the layer may harden in some areas too early, possibly having undesired effects such as significant knit lines around the molded layer of the golf ball. In disclosed embodiments, the heating system 112 is configured to heat the cavity surfaces 108 in order to inhibit the material from "freezing" or transitioning to solid state during molding.

In an exemplary embodiment, the heating system 112 may be an induction heating system including a heat source 124 and an induction coil 126. The heat source 124 may be an electrical power source and may include a controller and/or processer in order to control electrical pulses to the induction coil 126. The induction coil 126 may include electrical wiring connecting to the heat source 124 in order to enable electricity to flow through the induction coil 126 to thereby produce heat. In an embodiment, the induction coil 126 is built-in and runs through a portion of the mold body 104. The induction coil 126 may be positioned in the mold body 104 to quickly and efficiently heat one or more of the cavity surfaces 108 of the mold cavities 106. The heat source 124 may be controllable between an ON status in which the induction coil 126 is activated (electricity sent through the induction coil) to heat the cavity surface 108 to a target temperature and an OFF status in which the induction coil 126 is deactivated (no electricity sent through the induction coil) such that the cavity surface 108 can reduce below the target temperature. In some embodiments, the target temperature of the cavity surface 108 is greater than or approximately equal to a transition temperature of the injection material. The injection material in the mold cavity 106 is thereby heated and/or maintained above the transition temperature through contact with the heated cavity surface 108. This inhibits premature freezing of the injection material while the mold cavity 106 is being filled from the injection gates 122.

The cooling system 114 may be configured to rapidly cool the injection material in the mold cavity 106 after the mold cavity 106 has been filled. As a result, the injection material in the mold cavity 106 quickly hardens into a newly-formed golf ball layer. According to an embodiment, the cooling system 114 includes one or more cooling channels 128 and a pump 130 configured to move a cooling liquid through the cooling channel(s) 128. The one or more cooling channel(s) 128 may be hollow pathways formed through a portion of the mold body 104. The cooling channel(s) 128 are configured to enable the cooling liquid therein to absorb heat from the rest of the injection mold 102. The pump 130 moves the cooling liquid through and out of the mold body 104 in order to continuously replace heated cooling liquid. The cooling liquid may be supplied at a temperature well below a transition temperature of the injection material and the cooling channel(s) 128 may be positioned relative to the mold cavities 106 such that, in the absence of heat from the heating system 112, the injection material rapidly cools in the mold cavities 106.

The heating system 112 and the cooling system 114 are configured to work in conjunction with each other to control a temperature of the injection material over time. For example, the heating system 112 provides induction heating to cause the injection material to remain at or above a transition temperature until a "heat stop time" at which point the cooling system 114 takes over to cause the injection material to harden into a golf ball layer. For example, the heating system 112 heats the cavity surfaces 108 to a target temperature via the induction coil 126 and then stops powering the induction coil 126 at the heat stop time to allow cooling forces to dominate.

Further, the target temperature is set to be below the injection temperature of the injection material so that the injection material is not overheated in a manner that produces long cooling times for the layer being molded. RPIM systems are typically set to run in a continuous loop of receiving subassemblies/cores, injecting a layer-forming material, hardening/cooling the molded layer, and being demolded before returning to repeat the process to produce more golf balls. The present disclosure includes a configuration that prevents excessive increases in cool times as compared to conventional RPIM methods that do not include a system for heating cavity surfaces. For example, the heating system 112 may be configured to work simultaneously with the cooling system 114 to quickly convert from a heating stage to a rapid cooling stage without delay.

Figure 2A:
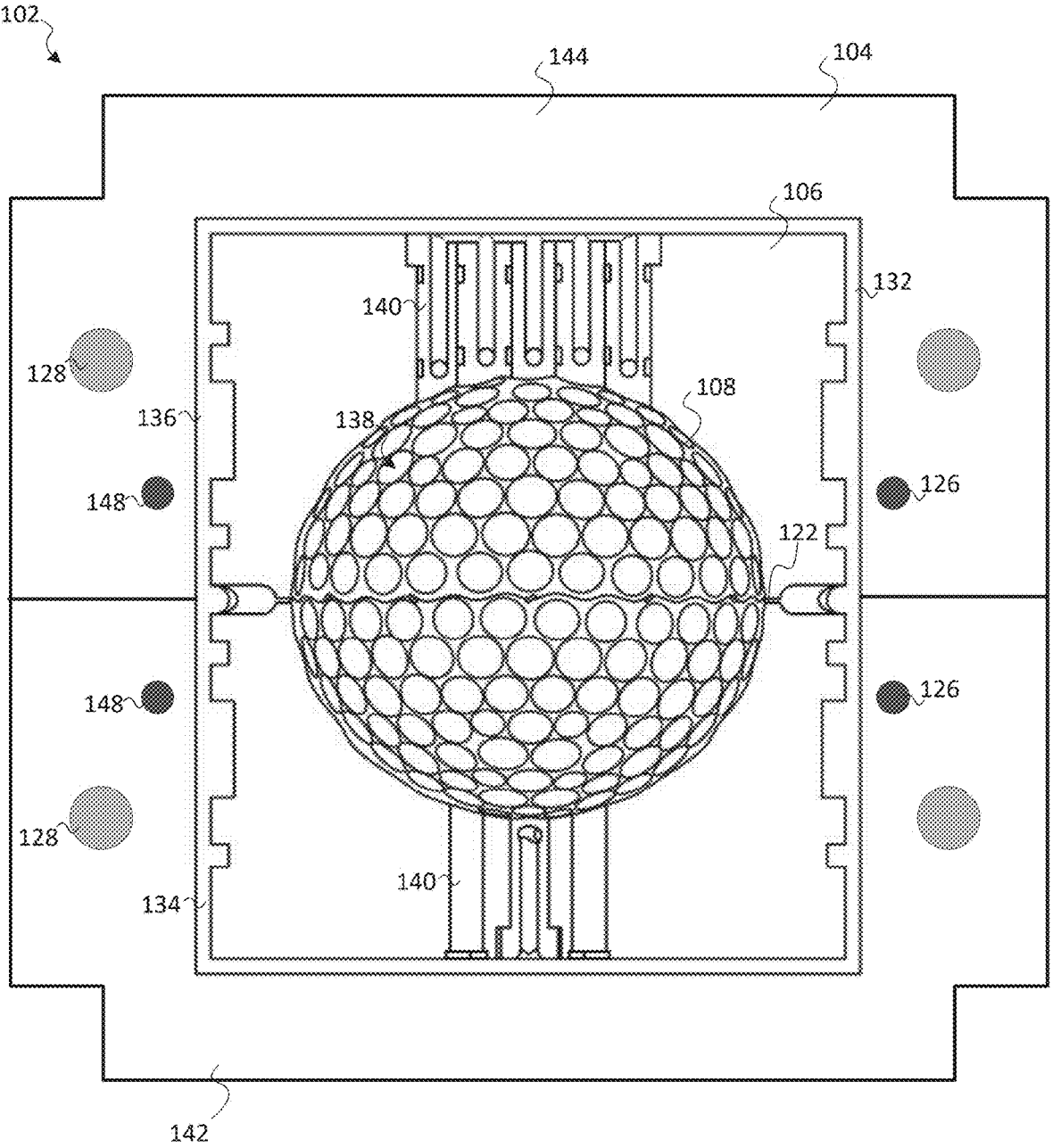
FIG. 2A is a cross-sectional view of a portion of an injection mold, according to a disclosed embodiment.
Figure 2B:
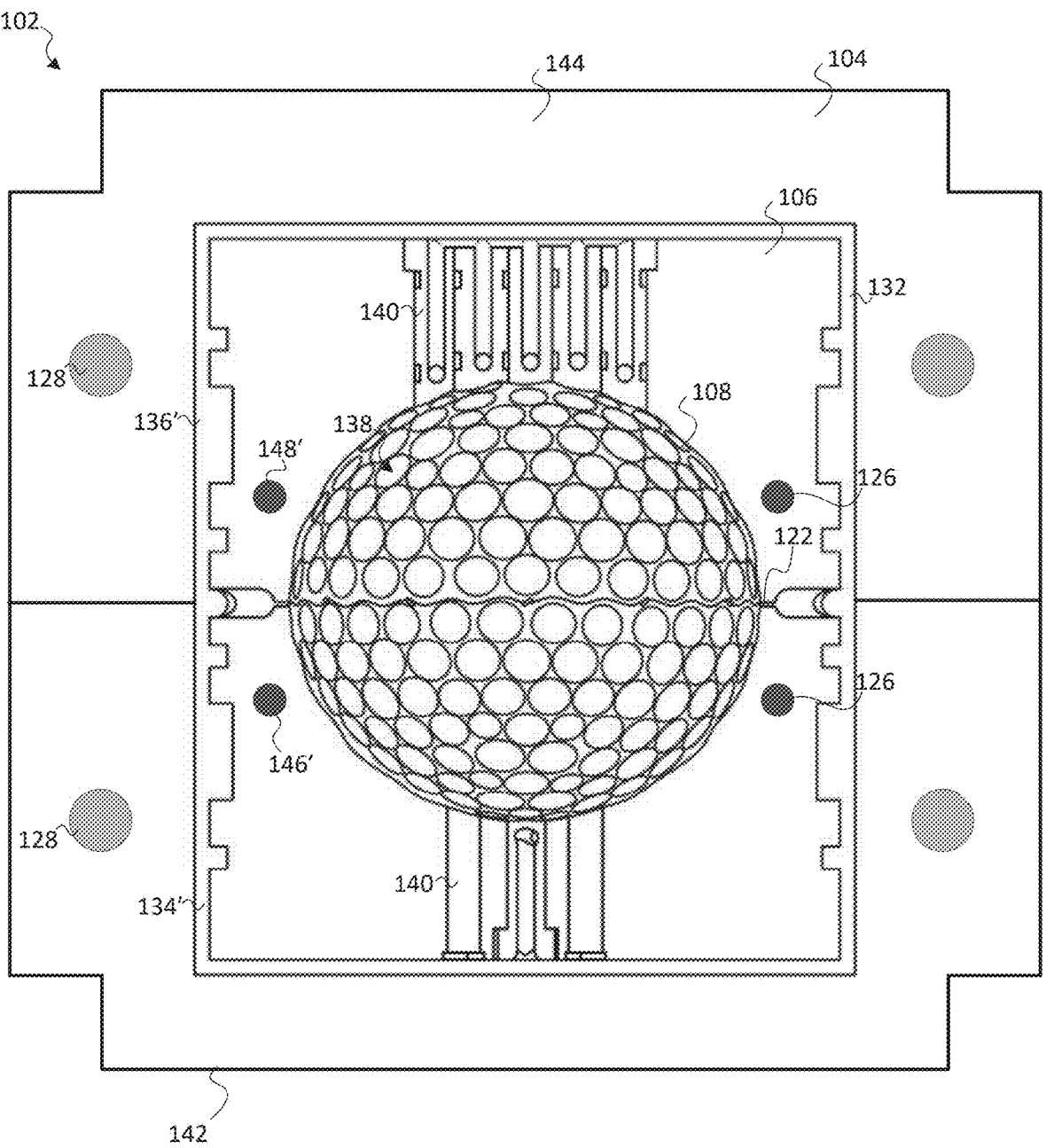
FIG. 2B is a cross-sectional view of a portion of an injection mold, according to another disclosed embodiment.

FIGS. 2A and 2B are cross-sectional views of exemplary embodiments of the injection mold 102, including a portion of the mold body 104 and a mold cavity 106 positioned therein. The mold cavity 106 includes a physical component that is positioned within the mold body 104. The mold cavity 106 may be separate from or integrally formed with the mold body 104. In one example, the mold cavity 106 includes a physical body 132 that includes the cavity surface 108. The mold cavity 106 may be a mold assembly including a first cavity 134 and a second cavity 136. Each cavity 134, 136 defines a portion of the cavity surface 108 and when positioned together they define an open space 138 therebetween for molding a layer of a golf ball. In an exemplary embodiment, the cavity surface 108 of the cavities 134, 136 includes a dimple pattern for a forming a cover layer of the golf ball. The mold cavity 106 further includes the injection gates 122 for directing injection material into the open space 138 during molding. The mold cavity 106 further includes a plurality of vents 140 configured to receive pins for use in an RPIM process for supporting a golf ball subassembly during molding and enabling venting of the open space 138 during and/or after material injection.

In an exemplary embodiment, the mold body 104 includes two opposing platens 142, 144, that sandwich the mold cavity 106. The first platen 142 may position the first cavity 134 and the second platen 144 may position the second cavity 136. In an exemplary embodiment, the platens 142, 144 are formed as solid metal plates. The platens 142, 144 may include integrally-formed features, such as interlocking pins for holding the platens 142, 144 together. In another example, the cooling channels 128 may be integrally formed in the solid structure of one or more of the platens 142, 144.

According to disclosed embodiments, the induction coil 126 extends through a portion of the mold body 104 near the mold cavity 106 in order to heat the body 132 and cavity surface 108. In other words, the induction coil 126 is positioned such that when the induction coil 126 has an ON status, the cavity surface 108 is quickly heated to a target temperature and when the induction coil 126 switches to an OFF status, the cavity surface 108 is no longer heated by the heating system 112.

In a first example, the induction coil 126 is positioned in the body of at least one of the platens 142, 144. For example, the induction coil 126 may be routed through the solid body of both of the platens 142, 144 in an area close to the mold cavity 106. In FIG. 2A, a first induction coil 146 is positioned in the first platen 142 close to the first cavity 134 and a second induction coil 148 is positioned in the second platen 144 close to the second cavity 136. In an embodiment, the induction coils 146, 148 may be positioned closer to the cavity surface 108 than the cooling channels 128. In another aspect of an embodiment, the induction coils 146, 148 may be positioned closer to the injection gate side of each cavity 134, 136 than to a venting side of each cavity 134, 136.

In a second example, the induction coil 126 is positioned in the body 132 of the mold cavity 106. For example, the induction coil 126 may be routed through a solid portion of both of the first cavity 134 and second cavity 136. In FIG. 2B a first induction coil 146' is positioned in the first cavity 134' and a second induction coil 148' is positioned in the second cavity 136'.

Figure 3A:
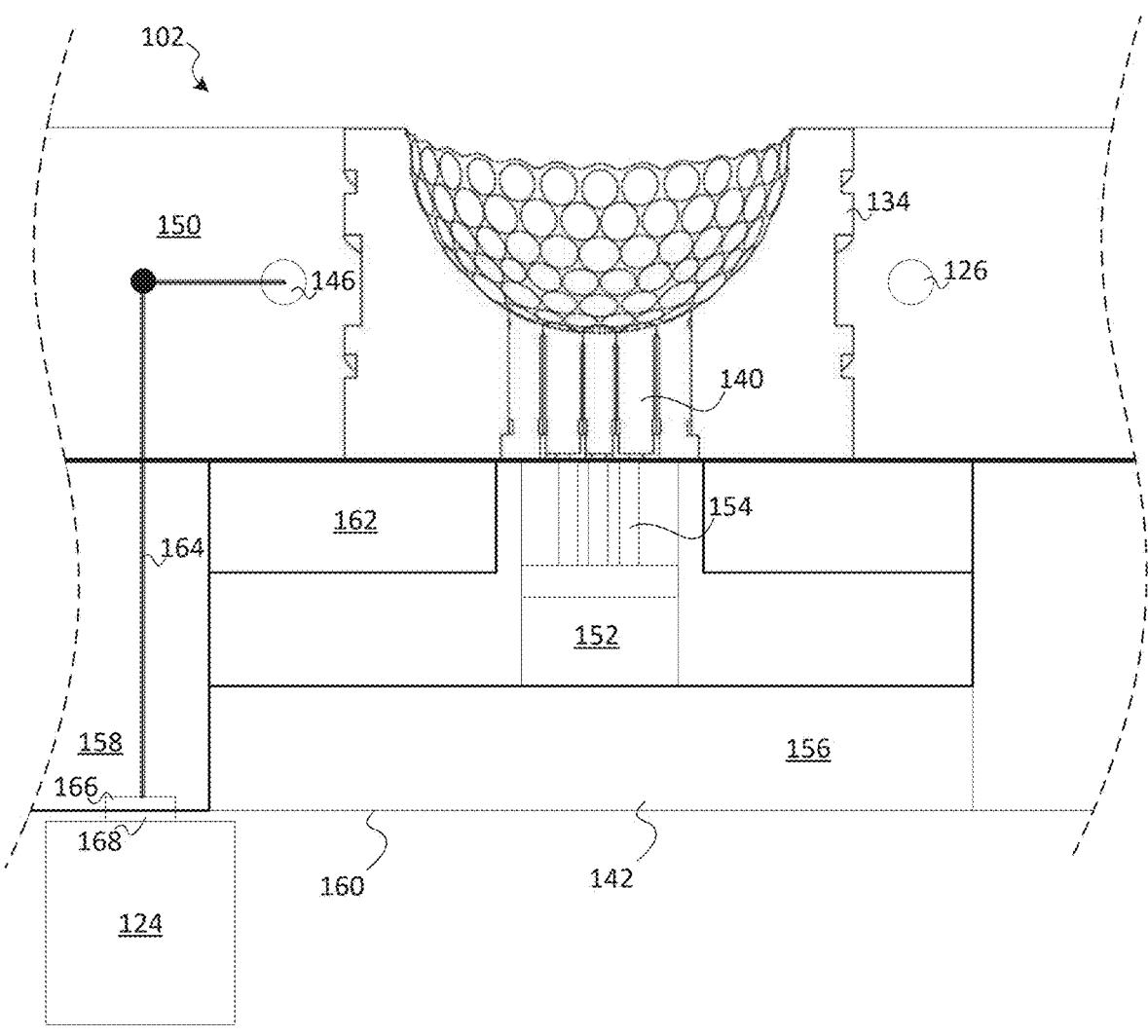
FIG. 3A is a cross-sectional view of a mold cavity and a mold body, according to a disclosed embodiment.
Figure 3B:
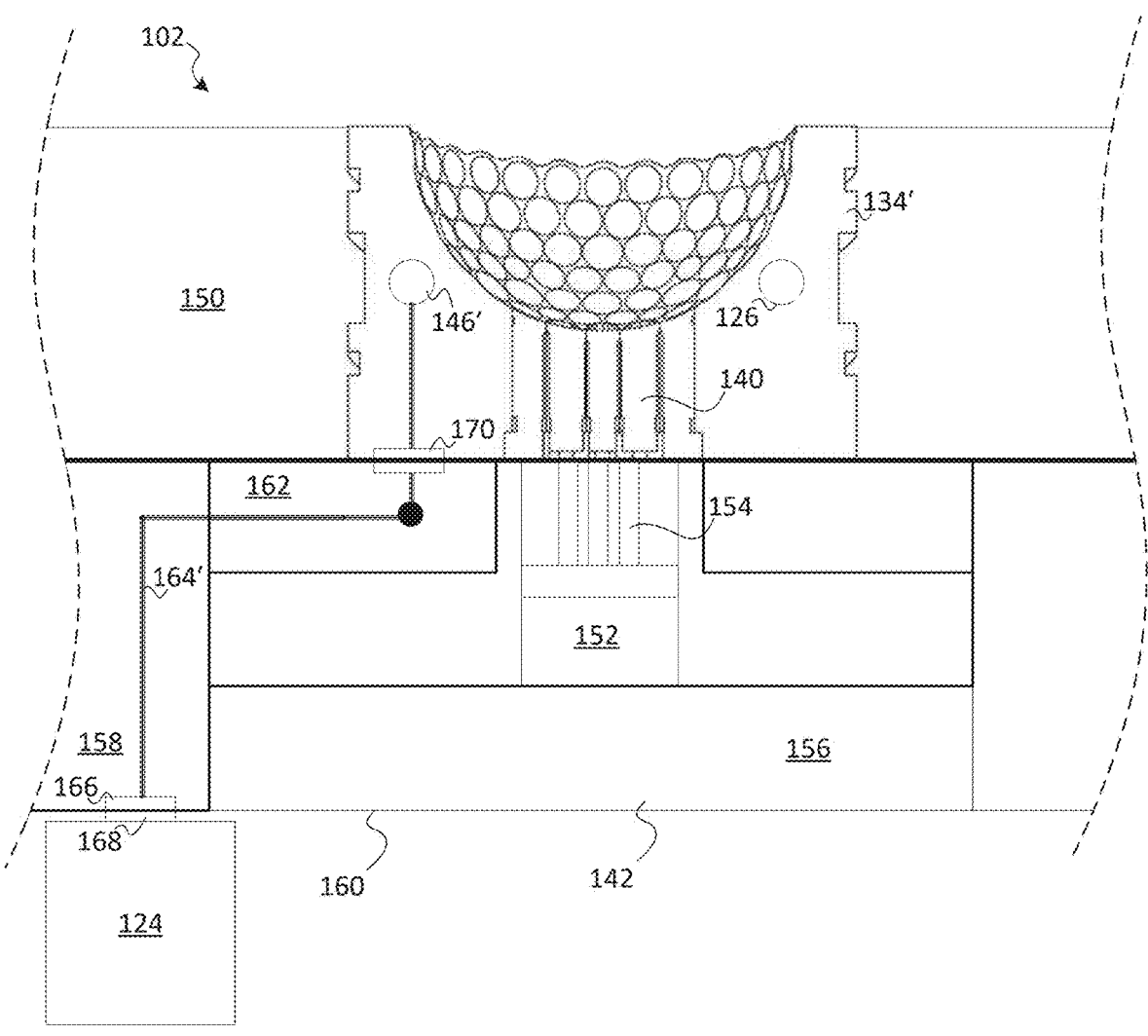
FIG. 3B is a cross-sectional view of a mold cavity and a mold body, according to another disclosed embodiment.

FIGS. 3A and 3B are further cross-sectional views of a portion of the golf ball mold assembly 100, including a diagram of an embodiment of a connection system between the heat source 124 and the induction coils 126. In an exemplary molding process, the injection mold 102 remains generally in one place during molding and demolding, so that the connection between the heat source 124 and the induction coil 126 is not disturbed. The cavity surfaces 108 are heated and golf ball layers are molded in the mold cavities 106. When sufficiently cooled, the golf balls parts (and excess solidified injection material in the runner system 120) are knocked out of the injection mold 102 and the cavity surfaces 108 are reheated for the next material injection. In some embodiments, the injection mold 102 may be separate and removable from certain components, such as the material supply 116, the heat source 124, and/or the pump 130. The present disclosure contemplates a removable connection for enabling the injection mold 102 to removably connect the internal induction coil 126 to the external heat source 124.

FIGS. 3A and 3B further depict exemplary components of the first platen 142 which may include one or more sections. The disclosed sections may be integral portions of the first platen 142 or separate interconnected plates. The second platen 144 may include the same or similar components. In one example, the platen 142 includes a main body section 150 that positions the plurality of mold cavities 106. The platen 142 may also include an RPIM section 152 that includes components for the retractable pin and venting aspects of the molding process. For example, the RPIM section 152 may house a plurality of retractable pins 154 that move into and out of the plurality of vents 140 in order to enable molding of a layer of a golf ball evenly around a golf ball subassembly (e.g., a golf ball core). The retractable pins 154 may be driven by hydraulic, pneumatic, or electric actuators (not shown). In some embodiments a fixed plate 156 may support the RPIM section 152 and provide access to the retractable pins 154. The platen 142 may further include a rear body section 158 that is positioned around RPIM section 152 and between the main body section 150 and a rear surface 160 of the platen 142. In some embodiments, the platen 142 further includes an intermediate body section 162 positioned near the retractable pins 154 and adjacent to the mold cavity 106. In some embodiments, at least the main body section 150 and the rear body section 158 are integrally formed as one piece. In some embodiments, the main body section 150, the rear body section 158, and the intermediate body section 162 are integrally formed as one piece.

FIG. 3A depicts an embodiment in which the induction coil 126 includes the first induction coil 146 in the body of the first platen 142. More specifically, the induction coil 146 is positioned in the main body section 150 of the platen 142. In order to connect the induction coil 146 to the heat source 124, insulated wiring 164 is routed through the platen 142 to the induction coil 146. For example, the insulated wiring 164 extends from a connector 166 at the rear surface 160, through the rear body section 158 and the main body section 150 to the induction coil 146. An external connector 168 is connected to the heat source 124 and configured to connect to the connector 166 on the rear surface 160 of the injection mold 102. As described herein, the heat source 124 may be an electrical power source configured to direct current through the induction coil 126. The connectors 166, 168 may be electrical connectors configured to quickly and securely connect to each other.

FIG. 3B depicts an embodiment in which the induction coil 126 includes the first induction coil 146' in the first cavity 134' of the mold cavity 106. The heat source 124 connects to the induction coil 146' through an insulated wiring 164' which connects at the rear surface 160 via the connectors 166, 168. If the body 132 of the mold cavity 106 is removable from the platen 142, an additional removable electrical connection 170 may be required between the platen 142 and the mold cavity 106. In this embodiment, the insulated wiring 164' may run through the intermediate body section 162 to reach the induction coil 146' in the cavity 134'. In other embodiments, the electrical connection 170 may be positioned between the main body section 150 and the body 132 of the mold cavity 106. While two embodiments are depicted, other configurations are possible to direct electrical power to the induction coil 126 in a manner consistent with the disclosed embodiments. It should be further understood that other electrical components, such as additional wiring to complete a circuit and/or run the circuit to ground may be included in order to provide operable functionality.

During the injection molding process, the material supply 116 is connected to the runner system 120 via the injection port 118, the heat source 124 is electrically connected to the induction coil 126, and the pump 130 is connected to deliver cooling liquid through the cooling channels 128. Golf ball subassemblies are placed into the mold cavities 106. The injection material enters the injection mold 102 and the runner system 120 distributes the molten injection material to the mold cavities 106 to be injected via the injection gates 122 around the golf ball subassemblies held in the mold cavities 106. The heating system 112 quickly heats the cavity surfaces 108 to a target temperature prior to the injection material reaching the injection gates 122 through the runner system 120. The target temperature is set to be slightly above or approximately equal to a transition temperature of the injection material (e.g., the glass transition temperature or the melting temperature of the injection material). The injection material is thereby maintained in a molten state as the melt fronts move through the open space 138 formed by the mold cavity 106, which advantageously inhibits the formation of undesired knit lines by preventing unwanted cooling and freezing of the injection material as the golf ball layer is formed. Further, the issue of undesirable knit lines may be more prevalent with the molding of especially thin cover layers, as the molten plastic is being delivered into a tighter area inside of the mold cavity and early freezing of the material may be more likely. As a result, another advantage of the present disclosure is an ability to more reliably and robustly mold thin layers, such as thin cover layers, by addressing early freezing with the disclosed heating system.

Figure 4:
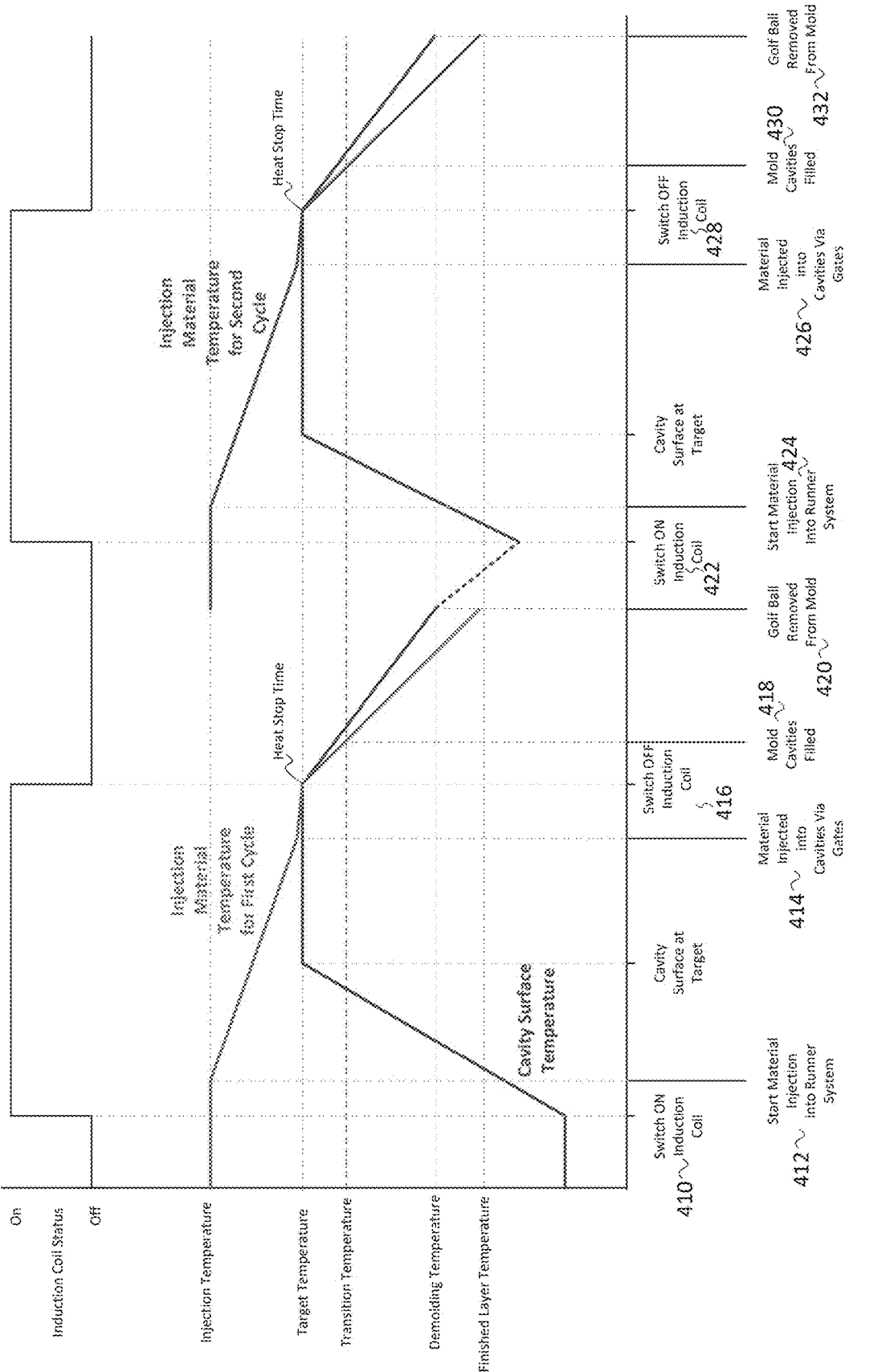
FIG. 4 is a graph of two molding cycles with exemplary timing of material injection and induction heating, according to a disclosed embodiment.

FIG. 4 is a graph of induction coil status together with injection material temperature and mold temperature across two molding cycles for forming a golf ball layer. Each molding cycle produces a golf ball part with a layer molded as a result of the molding cycle. The golf ball part includes a newly-formed layer, such as a newly-formed cover around a core or a newly-formed casing layer around a core. The graph generally depicts the timing of the material and mold temperatures in relationship to some steps in the molding process, but is not drawn to an exact scale. In one embodiment, the two cycles depicted in the graph apply to two cycles occurring within the same injection mold. In another embodiment, the two cycles relate to two different injection molds that are sequentially connected to a material supply and heat source. Further, additional steps which are not shown may also occur during the molding cycles, such as insertion of golf ball subassemblies, circulation of cooling liquid, and RPIM steps such as pin movement and venting.

Initially, an injection mold 102 consistent with disclosed embodiments may be set up with golf ball subassemblies present in the plurality of mold cavities 106 and proper connections for the injection system 110, heating system 112, and cooling system 114. The first steps of the first molding cycle include switching of the induction coil 126 to an ON status at step 410 and initiation of the material injection at step 412. In step 412, the material injection is initiated by directing injection material into the runner system 120 through the injection port 118 from the material supply 116. While FIG. 4 depicts step 410 occurring before step 412, the order may depend on how long it takes the injection material to travel from the injection port 118 to the injection gates 122. The injection material is injected into the injection mold 102 at an injection temperature at which the injection material is liquid and free-flowing. In some embodiments, the injection temperature is approximately 400-475° F. In a particular embodiment, the injection temperature is approximately 430° F. In other words, the injection material enters the injection mold 102 well above the melting temperature and glass transition temperature of the injection material.

The injection material thereafter travels through the runner system 120 to the mold cavities 106. At some time before the injection material reaches the injection gates 122, the cavity surface 108 reaches the target temperature via the heating system 112. In an exemplary embodiment, the heating system 112 is configured and calibrated to heat the cavity surface 108 to the target temperature and approximately maintain the target temperature. The target temperature is set to be slightly greater than or approximately equal to a transition temperature of the injection material. As the injection material travels through the runner system 120, its temperature steadily decreases toward a transition temperature. In an exemplary embodiment, the transition temperature of the injection material is approximately 300-310° F. In an particular embodiment, the transition temperature of the injection material is approximately 302° F. At step 414, the injection material reaches the injection gates 122 and is injected into the mold cavities 106. The injection material at step 414 is still greater than a transition temperature. The cavity surfaces 108 at the time of step 414 is being held at the target temperature, which according to a disclosed embodiment is at or slightly above the transition temperature of the injection material. For example, the target temperature may be approximately in a range of about 302-312° F. More generally, the target temperature may be approximately 100-175° F. less than the injection temperature. In another example, the target temperature is between approximately 120-140° F. less than the injection temperature.

At step 416, the heating system 112 switches the induction coil 126 to an OFF status. In addition, after step 414, the injection material fills mold cavities 106 over a period of time until the open space 138 is completely filled at step 418. In an exemplary embodiment, step 416 occurs before step 418. In other words, the heating of the cavity surfaces 108 is turned off prior to the complete filling of the mold cavity 106. Step 416 has been described herein as a "heat stop time" for the timing of switching the induction coil off. In some embodiments, the heat stop time may be set to occur at time when the mold cavity 106 is more than 50% filled. In one example, the induction coil is deactivated (i.e., switched to an OFF status) when the mold cavity 106 is 55-75% filled. In another example, the induction coil 126 is deactivated when the mold cavity 106 s 75-95% filled. In yet another example, the heat stop time may be set to occur approximately when the mold cavity 106 is 80-90% filled. In accordance with disclosed embodiments, the heat stop time may be set to occur before the cavity is completely filled in order to inhibit overheating of the material and to appropriately initiate cooling of the injection material such that the overall timing of the molding cycle is not longer than required. In some embodiments the heating of the cavity surface 108 occurs against the cooling liquid traveling in the cooling channels 128 such that when the heat stop time occurs, rapid cooling via the cooling system 114 is possible.

After steps 414 and 416, the formed golf ball layer continues to cool until the injection mold 102 reaches a demolding temperature. The demolding temperature may be, for example, approximately 50-100 OF less than the target temperature. At step 420, the molded parts with a newly-formed and solidified layer may be removed from the injection mold 102. The molded parts may be at a finished layer temperature at the time of removal from the injection mold 102. While shown in the graph as being less than the demolding temperature, it should be understood that the finished layer temperature may be greater than the demolding temperature, depending on the materials used and the method of measuring the temperature.

With the molded golf ball parts removed, the second molding cycle may be initiated to quickly mold more layers using the disclosed golf ball mold assembly 100 and produce more golf ball parts. For example, after the golf ball parts are removed at step 420, the process may be repeated by inserting new golf ball subassemblies into the mold cavities 106 of the injection mold 102 (or placed into a new injection mold if the process is sequential using different molds) and executing the further steps shown in the graph. For example, the second molding cycle may include step 422 (reactivating the induction coil 126 by switching the induction coil 126 back to an ON status), step 424 (initiating injection of injection material into the injection mold 102), step 426 (injection material reaches the injection gates 122), step 428 (switching the induction coil 126 to an OFF status), step 430 (the mold cavities are filled with injection material), and step 432 (removing the molded golf ball parts with a newly-formed and solidified layer).

The disclosed golf ball mold assembly of the present disclosure provides for consistent fluid flow and temperature control in forming a golf ball layer using injection molding, particularly RPIM processes. The disclosed heating system and associated methods inhibit the injection material from reaching a transition temperature until an appropriate time in the molding cycle. For example, by heating the temperature of the cavity surface to a target temperature at or above the transition temperature of the injection material, the injection material takes longer to freeze in the mold cavity. This extra time before freezing allows for better mixing at flow fronts, improved knit line strength, and thus improved durability of molded cover layers. In one example, golf ball covers formed using the systems and methods described herein have high mechanical strength and improved fracture durability. Moreover, the heating system is configured to work in tandem with a cooling system in order to enable precise timing of a cooling portion of the molding cycle, to thereby enable an efficient process that is not significantly delayed by the heating of the cavity surfaces.

Suitable injection materials that may be used with the golf ball mold assembly 100 include, but are not limited to, polyurethan and ionomer materials. For example, suitable injection materials may include partially neutralized ionomers; bimodal ionomers, such as Surlyn® AD 1043, 1092, and 1022 ionomer resins, commercially available from E. I. du Pont de Nemours and Company; ionomers modified with rosins; polyolefins; polyamides; polyesters; polyethers; polycarbonates; polysulfones; polyacetals; polylactones; acrylonitrile-butadiene-styrene resins; polyphenylene oxide; polyphenylene sulfide; styrene-acrylonitrile resins; styrene maleic anhydride; polyimides; aromatic polyketones; iono-mers and ionomeric precursors, acid copolymers, and con-ventional HNPs; polyurethanes, such as thermoplastic poly-urethanes; grafted and non-grafted metallocene-catalyzed polymers, such as single-site catalyst polymerized polymers, high crystalline acid polymers, cationic ionomers, and com-binations thereof.

In one embodiment, the injection material used with the golf ball mold assembly 100 includes a thermoplastic poly-urethane. For example, the golf ball mold assembly 100 of the present disclosure may be used to form an outer cover layer including thermoplastic polyurethane (TPU). Com-mercially-available examples of suitable thermoplastic poly-urethanes that can be used in accordance with this invention include TPUs sold under the trade names of Texin® 250, Texin® 255, Texin® 260, Texin® 270, Texin® 950U, Texin® 970U, Texin® 1049, Texin® 990DP7-1191, Texin® DP7-1202, Texin® 990R, Texin® 993, Texin® DP7-1049, Texin® 3203, Texin® 4203, Texin® 4206, Texin® 4210, Texin® 4215, and Texin® 3215, each commercially avail-able from Covestro LLC, Pittsburgh Pa.; Estane® 50 DT3, Estane® 58212, Estane® 55DT3, Estane® 58887, Estane® EZ14-23A, Estane® ETE 50DT3, each commercially avail-able from Lubrizol Company of Cleveland, Ohio; and Elas-tollan® WY1149, Elastollan® 1154D53, Elastollan® 1180A, Elastollan® 1190A, Elastollan® 1195A, Elastol-lan® 1185AW, Elastollan® 1175AW, each commercially available from BASF; Desmopan® 453, commercially available from Bayer of Pittsburgh, Pa., and the E-Series TPUs, such as D 60 E 4024 commercially available from Huntsman Polyurethanes of Germany.

The injection material may enter the mold cavity through any suitable type of injection gate. Different injection-molding gates can be used in accordance with the present disclosure and the number of gates can also vary. In one embodiment, the runner system 120 may utilize ring injec-tion-molding gates, such as those described in U.S. Pat. No. 6,235,230 to Puniello, the disclosure of which is hereby incorporated by reference. Such a design may improve the concentricity of the formed golf ball. In another embodi-ment, the runner system 120 may utilize edge gates.

The golf ball mold assembly 100 of present disclosure may include any type of retractable pin injection mold ("RPIM") system. In such systems, at the initial stage of the injection molding process, a golf ball subassembly placed inside the mold cavity is supported centrally within the mold by a plurality of retractable pins so as to leave a space for forming an intermediate or cover layer about the core. The retractable pins engage with the core to hold it securely in place. The injection material is then forced through the gates extending around the circumference of the mold cavity simultaneously filling the space between the golf ball core and inner surface of the mold cavity. Once the golf ball core is securely held in position by the injection material (and before the injected injection material contacts the retractable pins), the retractable pins may be disengaged from the core. Injection of the injection material continues until the mold cavity is completely filled. The injection material is then allowed to cool and harden. Once the injection material has sufficiently cooled, the mold cavity is opened, and the golf ball is removed for further processing (for example, for forming additional layers and/or surface treatments). The golf ball mold assembly 100 may also include an eject plate for removing the golf ball part with a newly-formed layer from the injection mold.

The disclosed embodiments are described in relationship to the disclosed figures. The figures depict exemplary embodiments that include elements for the purpose of illus-tration of the disclosed concepts. The figures are diagrams and embodiments consistent with the disclosure may include the described elements and/or additional elements with a different appearance or arrangement than that shown in the figures. Further, elements having the same reference number may be used to describe similar but not identical elements across different figures.

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or con-structions may not be described in detail for brevity or clarity.

The terms "about" and "approximately" shall generally mean an acceptable degree of error or variation for the quantity measured given the nature or precision of the measurements. Numerical quantities given in this descrip-tion are approximate unless stated otherwise, meaning that the term "about" or "approximately" can be inferred when not expressly stated.

The terminology used herein is for the purpose of describ-ing particular embodiments only and is not intended to be limiting. As used herein, the singular forms "a", "an" and "the" are intended to include the plural (i.e., "at least one") forms as well, unless the context clearly indicates otherwise.

Spatially relative terms, such as "above," "under," "below," "lower," "over," "upper," and the like, may be used herein for ease of description to describe one element or feature's relationship to another when the apparatus is right side up as shown in the accompanying drawings.

It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

The foregoing description illustrates and describes the processes, manufactures, and other teachings of the present disclosure. Additionally, the disclosure shows and describes only certain embodiments of the processes, manufactures, and other teachings disclosed, but, as mentioned above, it is to be understood that the teachings of the present disclosure are capable of use in various other combinations, modifica-tions, and environments and are capable of changes or modifications within the scope of the teachings as expressed herein, commensurate with the skill and/or knowledge of a person having ordinary skill in the relevant art. The embodi-ments described hereinabove are further intended to explain certain best modes known of practicing the processes, manu-factures, and other teachings of the present disclosure and to enable others skilled in the art to utilize the teachings of the present disclosure in such, or other, embodiments and with the various modifications required by the particular appli-cations or uses. Accordingly, the processes, manufactures, and other teachings of the present disclosure are not intended to limit the exact embodiments and examples disclosed herein. Any section headings herein are provided only for consistency with the suggestions of 37 C.F.R. § 1.77 or otherwise to provide organizational queues. These head-ings shall not limit or characterize the invention(s) set forth herein.

What is claimed is:

1. A method of forming a golf ball layer in an injection mold comprising an induction coil and a mold cavity defining a cavity surface, comprising:

positioning a golf ball subassembly in the mold cavity;

supplying an injection material to an injection port of a runner system disposed in the injection mold, wherein the injection material is at an injection temperature at the injection port;

activating the induction coil to heat the cavity surface to a target temperature which is less than the injection temperature;

forcing the injection material through the runner system to thereby begin to fill the mold cavity with the injection material from the runner system;

deactivating the induction coil while the mold cavity is filling with the injection material; and allowing the injection material to harden.

2. The method of claim 1, wherein the target temperature is approximately the melting temperature of the injection material or approximately the glass transition temperature of the injection material.

3. The method of claim 1, wherein the injection temperature is between approximately 400° F. and 475° F.

4. The method of claim 1, wherein the target temperature is between approximately 100-175° F. less than the injection temperature.

5. The method of claim 4, wherein the target temperature is between approximately 120-140° F. less than the injection temperature.

6. The method of claim 1, wherein the induction coil is deactivated when the mold cavity is more than 50% filled.

7. The method of claim 6, wherein the induction coil is deactivated when the mold cavity is 55-75% filled.

8. The method of claim 6, wherein the induction coil is deactivated when the mold cavity is 75-95% filled.

9. The method of claim 1, further comprising extending a plurality of retractable pins into the mold cavity to securely position the golf ball subassembly.

10. The method of claim 9, wherein the retractable pins are hydraulically, pneumatically, or electrically actuated.

11. The method of claim 9, wherein filling the mold cavity comprises injecting the injection material into the mold cavity through an injection gate extending around a circumference of the mold cavity until the mold cavity is completely filled.

12. The method of claim 11, wherein the gate is a ring gate or an edge gate.

13. The method of claim 11, wherein the injection material comprises at least one of a polyurethane or ionomer material.

14. The method of claim 1, wherein the injection mold further comprises a cooling system comprising a cooling channel configured to receive a cooling liquid.

15. The method of claim 14, wherein the induction coil is configured to heat the cavity surface against a cooling effect of the cooling system while the cooling liquid is in the cooling channel.

16. The method of claim 15, wherein the cooling liquid cools the cavity surface to a demolding temperature after the induction coil is deactivated.

17. The method of claim 16, further comprising removing molded parts after the cavity surface reaches the demolding temperature.

18. The method of claim 17, wherein the demolding temperature is between approximately 50-100° F. less than the target temperature.

19. The method of claim 17, further comprising reactivating the induction coil after the molded parts are removed.

* * * * *